(12) United States Patent
Schorle et al.

(10) Patent No.: US 7,059,631 B2
(45) Date of Patent: Jun. 13, 2006

(54) METHOD AND APPARATUS FOR COUPLING A DRIVER'S SIDE AIRBAG TO A STEERING WHEEL

(75) Inventors: Michael A. Schorle, Saint Clair Shores, MI (US); Peter L. Vigeant, Troy, MI (US); Joseph J. Mannino, Bloomfield Hills, MI (US); Bryan H. Stover, Troy, MI (US)

(73) Assignee: Toyoda Gosei Co., Ltd., Aichi (JP)

( * ) Notice: Subject to any disclaimer, the term of this patent is extended or adjusted under 35 U.S.C. 154(b) by 176 days.

(21) Appl. No.: 10/425,180

(22) Filed: Apr. 29, 2003

(65) Prior Publication Data

US 2004/0217580 A1 Nov. 4, 2004

(51) Int. Cl.
*B60R 21/16* (2006.01)

(52) U.S. Cl. .................... 280/731; 280/728.2
(58) Field of Classification Search ................ 280/731, 280/728.2
See application file for complete search history.

(56) References Cited

U.S. PATENT DOCUMENTS

| | | | |
|---|---|---|---|
| 5,087,069 A * | 2/1992 | Corbett et al. ............... | 280/731 |
| 5,239,147 A | 8/1993 | Allard et al. | |
| 5,303,952 A | 4/1994 | Shermetaro et al. | |
| 5,331,124 A | 7/1994 | Danielson | |
| 5,380,037 A * | 1/1995 | Worrell et al. ............ | 280/728.2 |
| 5,410,114 A | 4/1995 | Furuie et al. | |
| 5,459,294 A | 10/1995 | Danielson | |
| 5,508,481 A * | 4/1996 | Williams et al. .......... | 200/61.54 |
| 5,508,482 A | 4/1996 | Martin et al. | |
| 5,624,130 A | 4/1997 | Ricks | |
| 5,630,611 A | 5/1997 | Goss et al. | |
| 5,636,858 A * | 6/1997 | Niederman et al. ...... | 280/728.2 |
| 5,762,359 A | 6/1998 | Webber et al. | |
| 5,765,860 A * | 6/1998 | Osborn et al. ............ | 280/728.2 |
| RE36,351 E | 10/1999 | Yamamoto et al. | |
| 6,029,992 A | 2/2000 | Vendely et al. | |
| 6,082,758 A | 7/2000 | Schenck | |
| 6,196,573 B1 | 3/2001 | Worrell et al. | |

(Continued)

FOREIGN PATENT DOCUMENTS

JP 10-44914 2/1998

(Continued)

*Primary Examiner*—Paul N. Dickson
*Assistant Examiner*—Joselynn Y. Sliteris
(74) *Attorney, Agent, or Firm*—Jean C. Edwards, Esq.; Akerman Senterfitt

(57) ABSTRACT

A steering wheel subassembly with an armature and a clip. The clip has a first leg disposed in a first slot of the armature, a bend extending from the first leg, and a second leg extending from the bend. The second leg is disposed in a second slot on the armature and the clip is movable between a rest and displaced position. The clip partially obstructs a hole in the armature configured to receive a connecting part such as a pin. The clip legs exert a preload on armature engagement surfaces. The invention is further directed to a method for coupling the clip to the steering wheel armature as well as a steering wheel assembly having the steering wheel subassembly described above. The invention is still further directed to a configuration of a mounting bracket with an airbag subassembly adapted to be coupled to the steering wheel subassembly. The invention is also directed to a cover for the steering wheel subassembly wherein the cover and armature cooperate to define an access passage aligned with one of the clip legs.

5 Claims, 9 Drawing Sheets

U.S. PATENT DOCUMENTS

| | | |
|---|---|---|
| 6,199,908 B1 | 3/2001 | Isomura et al. |
| 6,237,944 B1 * | 5/2001 | Worrell et al. ............... 280/731 |
| 6,276,711 B1 * | 8/2001 | Kurz et al. ............... 280/728.2 |
| 6,325,408 B1 * | 12/2001 | Ford ....................... 280/728.2 |
| 6,354,622 B1 | 3/2002 | Ulbrich et al. |
| 6,457,379 B1 | 10/2002 | Mirone |
| 6,464,247 B1 | 10/2002 | Laue |
| 6,474,682 B1 * | 11/2002 | Ikeda et al. .................. 280/731 |
| 6,554,312 B1 * | 4/2003 | Sakane et al. ............ 280/728.2 |
| 6,568,702 B1 * | 5/2003 | Ford ....................... 280/728.2 |
| 6,874,808 B1 * | 4/2005 | Marath et al. ............ 280/728.2 |
| 2001/0011815 A1 | 8/2001 | Ikeda et al. |
| 2001/0054810 A1 | 12/2001 | Sakane et al. |
| 2002/0043786 A1 | 4/2002 | Schutz |
| 2002/0053786 A1 | 5/2002 | Paonessa |
| 2002/0074781 A1 | 6/2002 | Schutz et al. |
| 2002/0125698 A1 | 9/2002 | Schutz |
| 2002/0153714 A1 | 10/2002 | Kreuzer |
| 2004/0169358 A1 * | 9/2004 | Fujita et al. ................. 280/731 |

FOREIGN PATENT DOCUMENTS

| | | |
|---|---|---|
| JP | 10-244899 | 9/1998 |
| JP | 2001-26249 | 1/2001 |

* cited by examiner

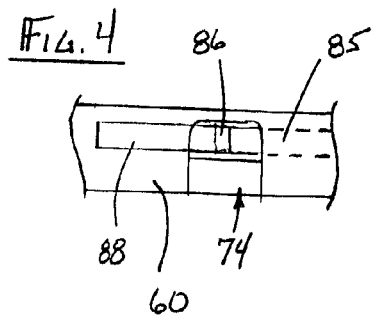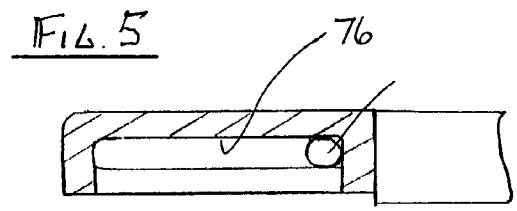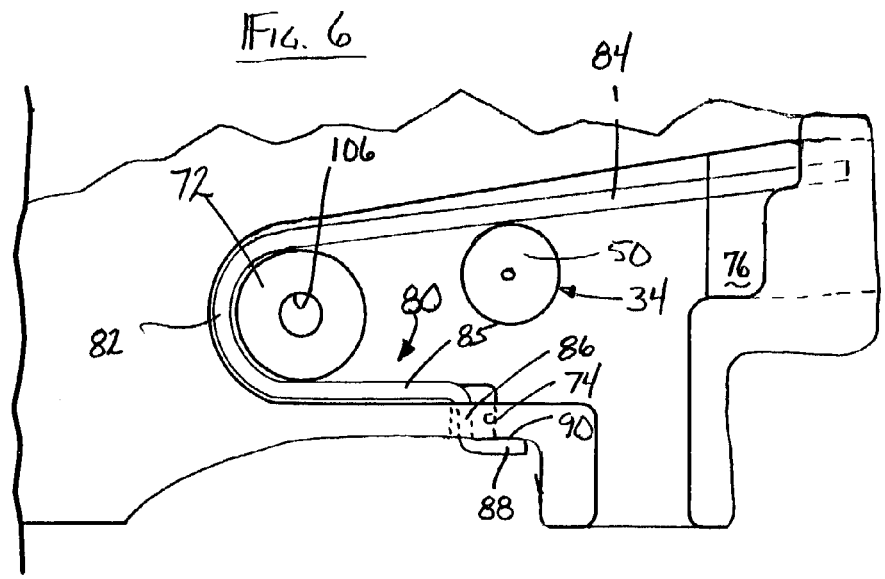

METHOD AND APPARATUS FOR COUPLING A DRIVER'S SIDE AIRBAG TO A STEERING WHEEL

BACKGROUND OF THE INVENTION

1. Technical Field

The present invention is generally directed to a steering wheel for an automobile and, more particularly, to a method and mechanism for coupling an airbag subassembly to a steering wheel subassembly.

2. Discussion

Current motor vehicles include a variety of occupant safety and restraint systems including driver side airbags (DAB). In general, DAB systems include an airbag module that is coupled to the armature of the steering wheel. Numerous approaches are used in the art to couple the airbag module to the steering wheel subassembly. One such system includes pins fixed to an airbag housing or bracket and spring clips on the steering wheel. Each pin includes a groove that receives the clip to retain the airbag module to the steering wheel. While pin and clip systems are generally effective coupling arrangements for these applications, a need exists for improvements that ensure proper alignment of the pins and clips as well as to simplify the attachment of the clips to the steering wheel. Other conventional DAB systems suffer from other deficiencies including an excessive number of parts that are necessary only for the coupling function and configurations that are overly complex to manufacture or assembly.

Another drawback of conventional steering wheel assemblies is that after the airbag module is attached to the steering wheel, it is difficult to remove the module for repair or replacement. Commonly, a technician must remove the airbag module blindly, that is, without fit of being able to see the mechanisms that must be manipulated to effectuate removal.

Current designs include clearance holes on a cover of the steering wheel to proved access with a removal tool. However, movement of the removal tool is generally permitted in multiple directions thereby hampering proper alignment of the tool. Accordingly, a steering wheel design that facilitates blind removal of the airbag module from the steering wheel would be of great benefit to the technician.

SUMMARY OF THE INVENTION

The present invention includes a number of features that address the deficiencies discussed above. For example, one aspect of the invention is an airbag subassembly bracket that includes connecting parts, such as the above described pins, and which provides a rigid arrangement improving assembly ease and structural strength.

Another aspect of the present invention is a steering wheel armature and clip design that effectively restrains the clips on the armature and facilitates installation of the clips on the armature.

Yet another aspect of the present invention is a steering wheel armature and back cover that cooperate to define an access passage that effectively traps a removal tool to facilitate removal of the airbag module from the steering wheel armature.

In view of the above, the present invention is directed to a steering wheel subassembly with an armature and a clip. The clip has a first leg disposed in a first slot of the armature, a bend extending from the first leg, and a second leg extending from the bend. The second leg is disposed in a second slot on the armature and the clip is movable between a rest and displaced position. The clip partially obstructs a hole in the armature configured to receive a connecting part such as a pin. The clip legs exert a preload on armature engagement surfaces. The invention is further directed to a method for coupling the clip to the steering wheel armature as well as a steering wheel assembly having the steering wheel subassembly described above. The invention is still further directed to a configuration of a mounting bracket with an airbag subassembly adapted to be coupled to the steering wheel subassembly. The invention is also directed to a cover for the steering wheel subassembly wherein the cover and armature cooperate to define an access passage aligned with one of the clip legs.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 4 is a partial elevation view showing the first slot and clip coupling;

FIG. 5 is a partial sectional view showing the second slot and engagement of the clip;

FIG. 6 is a partial plan view of the armature and clip showing the clip in its displaced position;

DETAILED DESCRIPTION OF THE PREFERRED EMBODIMENT

Figure 1:
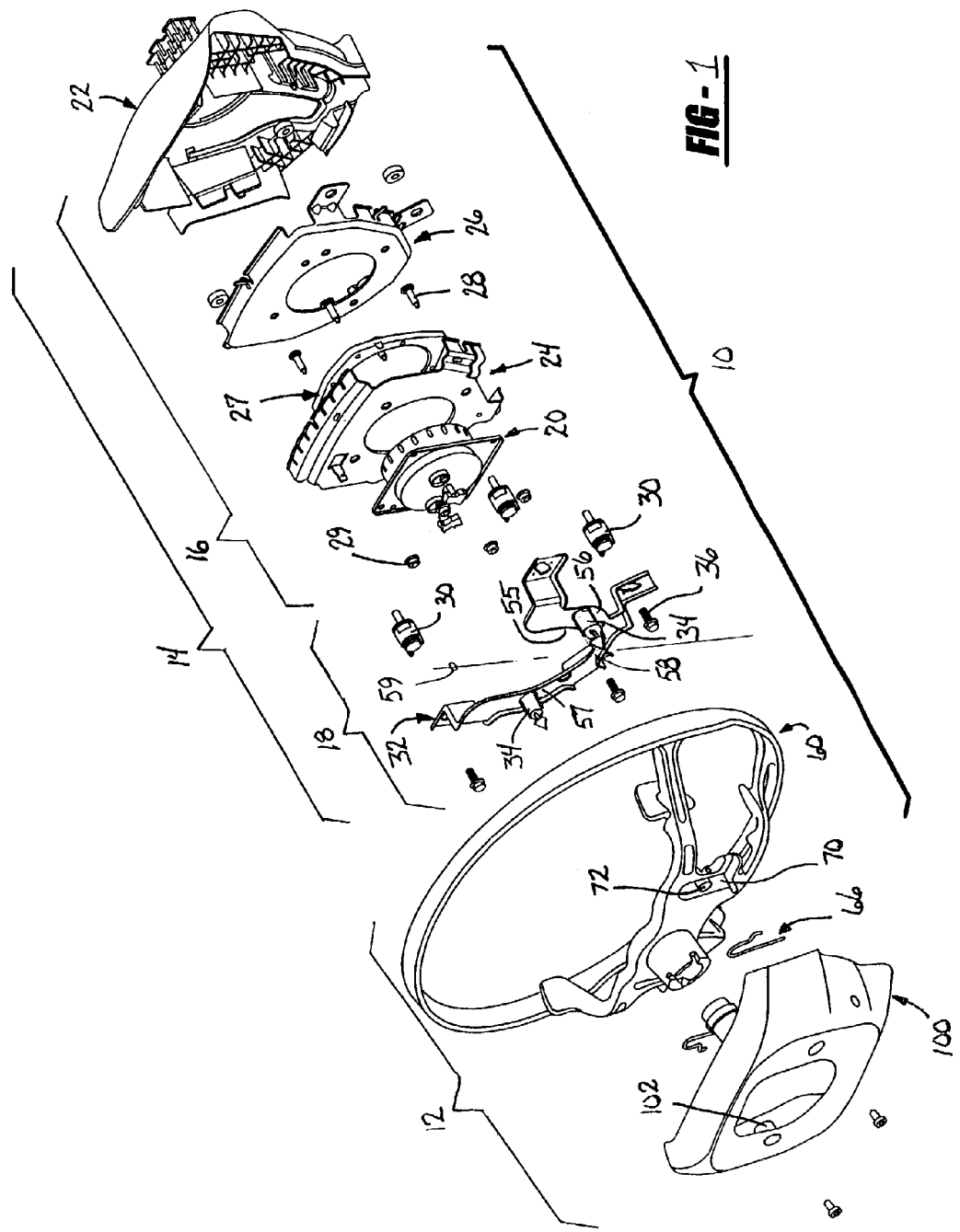
FIG. 1 is an exploded perspective view of the steering wheel assembly of the present invention.

As is shown in the drawings, the steering wheel assembly 10 of the present invention includes a steering wheel subassembly 12 and an airbag subassembly 14. The airbag subassembly 14, generally includes an airbag module 16 coupled to a horn module 18, and pins 34 configured to couplingly engage clips 66 to provide a snap-in attachment of the airbag subassembly 14 to the steering wheel subassembly 12.

Figure 2:
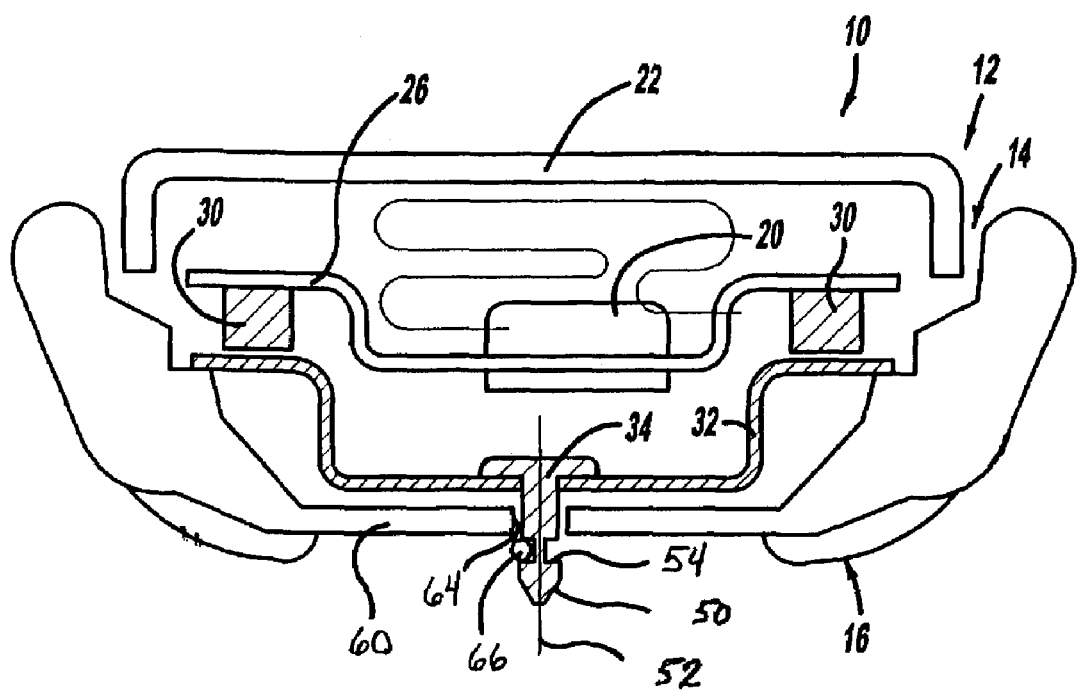
FIG. 2 is a sectional view of a steering wheel assembly according to the invention.

The airbag module 16 is shown in FIGS. 1 and 2 to include an inflator 20, front cover 22, locking plate 24, housing 26, and retainer ring 27. The retainer ring 27 couples the inflator 20 to the locking plate 24 via bolts 28 and nuts 29 and the housing 26 is fixed to the locking plate 24 such as by rivets. The horn module 18 includes horn contacts 30, a bracket 32, and one or more locking pins 34 fixed to the bracket 32 in a manner generally known in the art such as by welding, clinching, staking, and the like. In the present embodiment, the pin is staked to the bracket and includes a recess proximate its head end to receive bracket material during staking. The housing 26 is also coupled to the horn bracket 32 to permit movement of the housing 26 and the rest of the airbag module 16 relative to the bracket 32 whereby the driver operates the horn by pushing on the front cover 22 causing the horn contact 30 to close the horn circuit. Notwithstanding the above discussion, those skilled in the art will appreciate that the components of the airbag subassembly may be varied without departing from the scope of the invention. By way of example rather than limitation, it is noted that the locking plate 24 may be eliminated and the front cover 22 riveted directly to the housing 26.

A variety of horn contacts 30 may be used with the present invention. By way of illustration, reference may be made to U.S. Pat. No. 6,474,682 issued to Ikeda et al. on Nov. 5, 2002 and entitled "Steering Wheel With An Airbag Device" (the '682 patent), the entire disclosure of which is hereby incorporated by reference. As is more fully explained in the '682 patent, the horn contacts 30 are configured to receive bolts 36 to couple the bracket 32 to the housing 26, are biased to maintain the horn circuit open, and permit the above described relative movement between the horn module 18 and airbag module 16. For completeness, it is noted that the above description of the airbag and horn modules 16 and 18 is provided for illustrative purposes recognizing that a variety of modifications may be made without departing from the scope of the invention defined by the appended claims.

Each locking pin 34 is shown to include a leading conical end having a contact surface 50 (FIG. 2) that is concentric about a pin axis 52 and an annular groove 54 that extends about the entire circumference of the pin. It is noted that FIG. 2 illustrates a single pin 34 coupling the bracket 32 to the armature 60 while FIG. 1 shows the bracket supporting a pair of pins. Those skilled in the art will appreciate that a variety of pin configurations may be used with the present invention.

In order to provide suitable structural support for the pins during assembly and use of the invention, the bracket 32 is illustrated as a generally U-shaped stamped steel member with first and second pin support sections 56 and 57 and a lateral connecting section 58 extending across a bracket axis 59 and between the pin sections 56 and 57. The structural interconnection of the pin support sections 56 and 57 provided by the connecting section 58 increases the stability to the bracket 32. More particularly, the continuity between the pin support sections resists deflection of the pin support sections and maintains proper pin alignment when the airbag subassembly 14 is coupled to the steering wheel subassembly 12 via the pins 34 as hereinafter described. The illustrated U-shaped bracket 32 also includes a cavity 55 that accommodates the inflator 20 and provides clearance for electrical assembly, connections, and movement of the inflator relative to the bracket during actuation of the horn. Notwithstanding the illustrated example, those skilled in the art will appreciate that other bracket configurations may be used. For example, while the lateral connecting section 58 is shown to extend from and between lower ends of the pin sections, the connecting section 58 may extend from virtually any location along the pin support sections. Further, multiple connecting sections or a solid plate without a cavity may also be used. Additionally, while two pins and pin support sections are shown and described herein, the invention may have virtually any number of pins and pin support sections, preferably at least two pins with at least one pin and support section on each side of the bracket axis 59. Still further, while a stamped steel bracket is preferred for manufacturing ease, strength, and electrical conductivity, other suitable materials may be used.

The steering wheel subassembly 12 includes an armature 60 (FIG. 3), a structural skeleton that is supported by and rotatable with the steering wheel shaft (not shown), with cavities 62 and holes 64 sized to receive the pins 34. Each cavity is configured to receive a clip 66 and is partially defined by side walls 67 that generally circumscribe a recessed face 71. The armature 60 also includes a positioning hub 72 extending from the face 71 and first and second slots 74 and 76. The slots extend through the side wall 67 and the recessed face 71 to permit coupling of a clip to the armature (FIGS. 4 and 5). Two cavities and clips are shown, with the clips coupled to the armature 60 and partially obstructing the armature holes 64 when the clips are in their rest position (FIG. 3).

Figure 3:
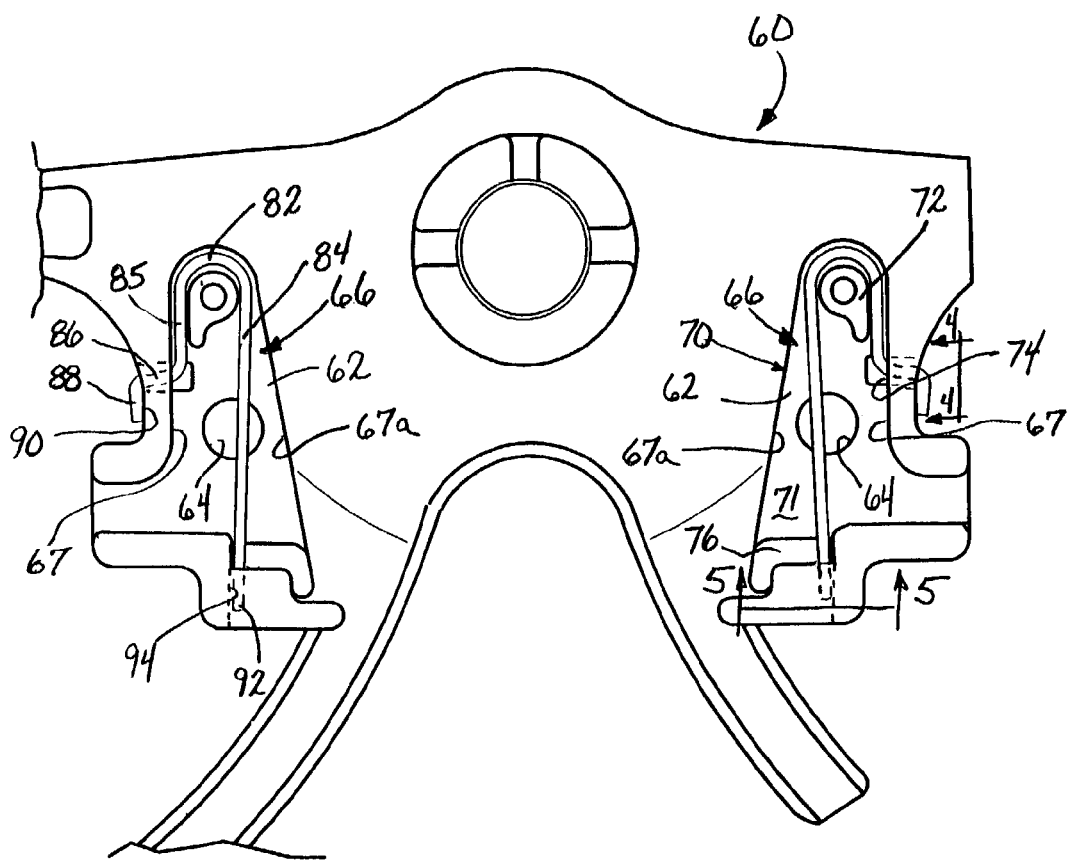
FIG. 3 is a plan view of the steering wheel armature and clips shown in FIG. 1.

The clips 66 are preferably formed from an elastically deformable and resilient metal spring rod having a first leg 80, a bend 82 extending from the first leg, and a second leg 84 extending from the bend 82 (FIG. 3). The first leg 80 includes a first part 85, a second part 86 substantially orthogonal to the first part, and a third part 88 substantially orthogonal to the second part. The first and second legs 80 and 84 and the bend 82 are coplanar thereby simplifying manufacture. When each of the clips 66 are assembled on the armature 60 (FIGS. 3–5), the second part 86 extends through the first slot 74, the third part 88 engages a first engagement surface 90 proximate the first slot, the bend 82 is positioned about the hub 72, and an end 92 of the second leg 84 is disposed in the second slot 76 and engages a second engagement surface 94 proximate the second slot. The cavity side walls proximate the second leg 84 (e.g. walls 67*a* in FIG. 3), are angled to permit displacement of the second leg 84 between a rest position (FIG. 3) and a displaced position (FIG. 6) and coupling engagement with the pin groove 54 during assembly as well as disassembly of the airbag subassembly 14 from the steering wheel subassembly 12 if desired.

As will be discussed in greater detail below, the steering wheel subassembly also includes a back cover 100 that is coupled to the armature 60 prior to intercoupling the airbag and steering wheel subassemblies 14 and 12. However, it is expected that the assembly processes may require transportation of the armature and clip assembly prior to attaching the back cover. In such a case, it is desirable that the clip be firmly coupled to the armature to prevent inadvertent dislodgement. Thus, the clip and armature are configured such that connection of the clip to the armature creates a preload on the clip in its rest position. This preload assists in maintaining the spring in its illustrated position within the armature cavity 62. Accordingly, as is more fully described below, the clip is elastically deformed during installation such that the preload acts on first and second engagement surfaces 90 and 94 of the armature proximate the first and second slots 74 and 76.

Figure 7A:
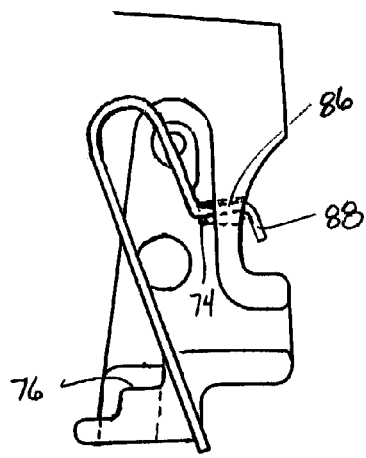
FIGS. 7a–7c show a preferred sequence of assembling the clip to the armature.
Figure 7B:
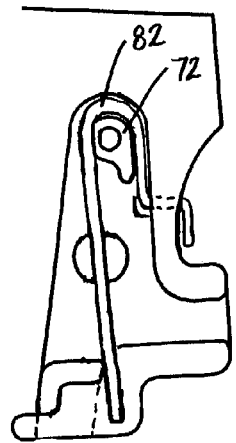
Figure 7C:
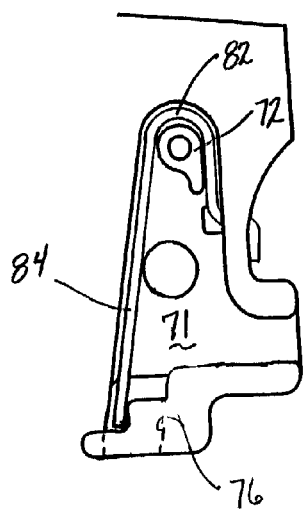
Figure 8:
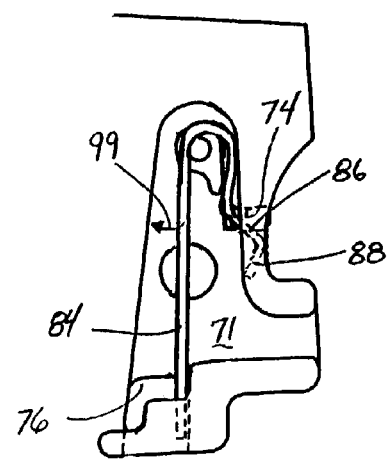
FIG. 8 illustrates an alternative assembly method.

A preferred method of assembling the clip 66 to the armature 60 is shown in FIGS. 7a–7c and includes the steps of disposing the second and third clip parts 86 and 88 through the first slot 74 (FIG. 7a), rotating the clip to orient the bend 82 to receive the hub 72 (FIG. 7b), elastically displacing the second leg 84 to align with the second slot 76 and moving the clip toward the face 71 to dispose the leg 84 in the second slot 76 and the bend 82 about the hub 72 (FIG. 7c), and releasing the leg 84 such that the resilient force displaces the leg 84 into engagement with the armature material defining the second slot 76 (as shown in FIG. 3). As noted above, once installed in the described manner, some elastic deformation of the clip is maintained by the space between the first and second slots so as to create the desired preload. While it is anticipated that this assembly method provides the most suitable assembly process, it is noted that the clips 66 may be coupled to the armature 60 through other assembly processes without departing from the scope of the invention defined by the appended claims. For example, the second and third clip parts 86 and 88 may be disposed in the first slot 74 in the manner shown in FIG. 7a and then disposing the second leg 84 in the second slot 76 (FIG. 8) and displacing (i.e., rotating) the clip toward the face 71 (arrow 99) to dispose the bend 82 about the hub 72 and create the desired preload.

Figure 9:
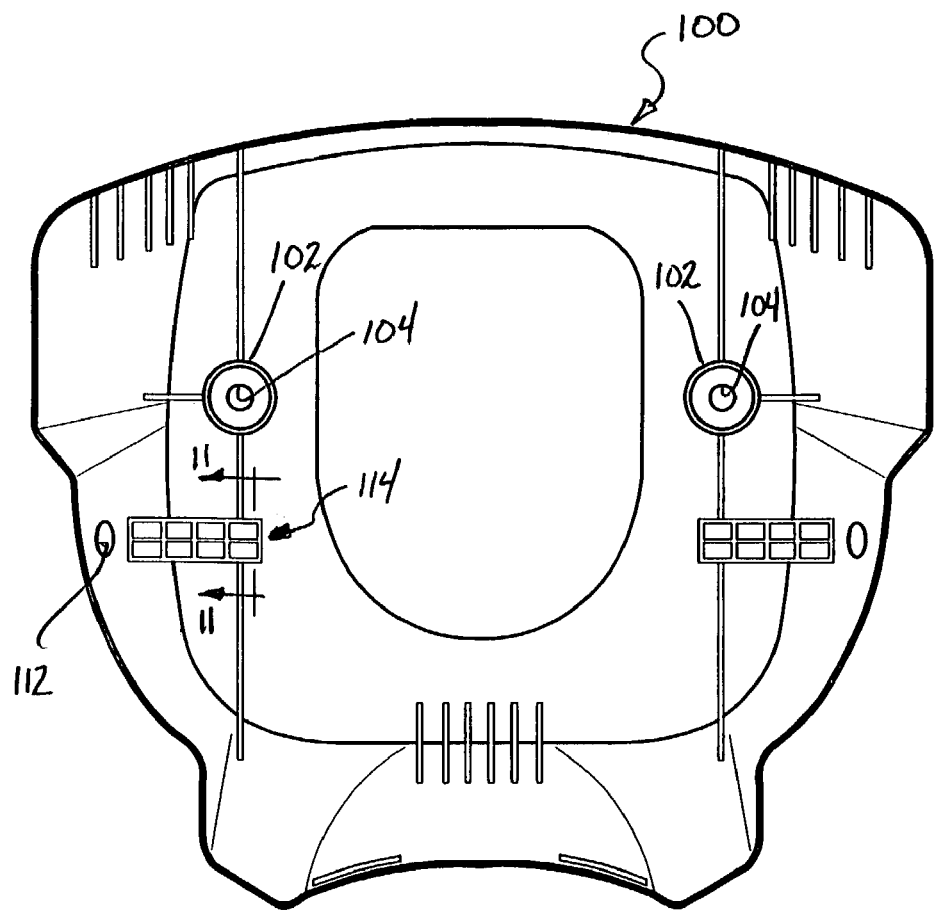
FIG. 9 is a plan view of the back cover shown in FIG. 1.
Figure 10:
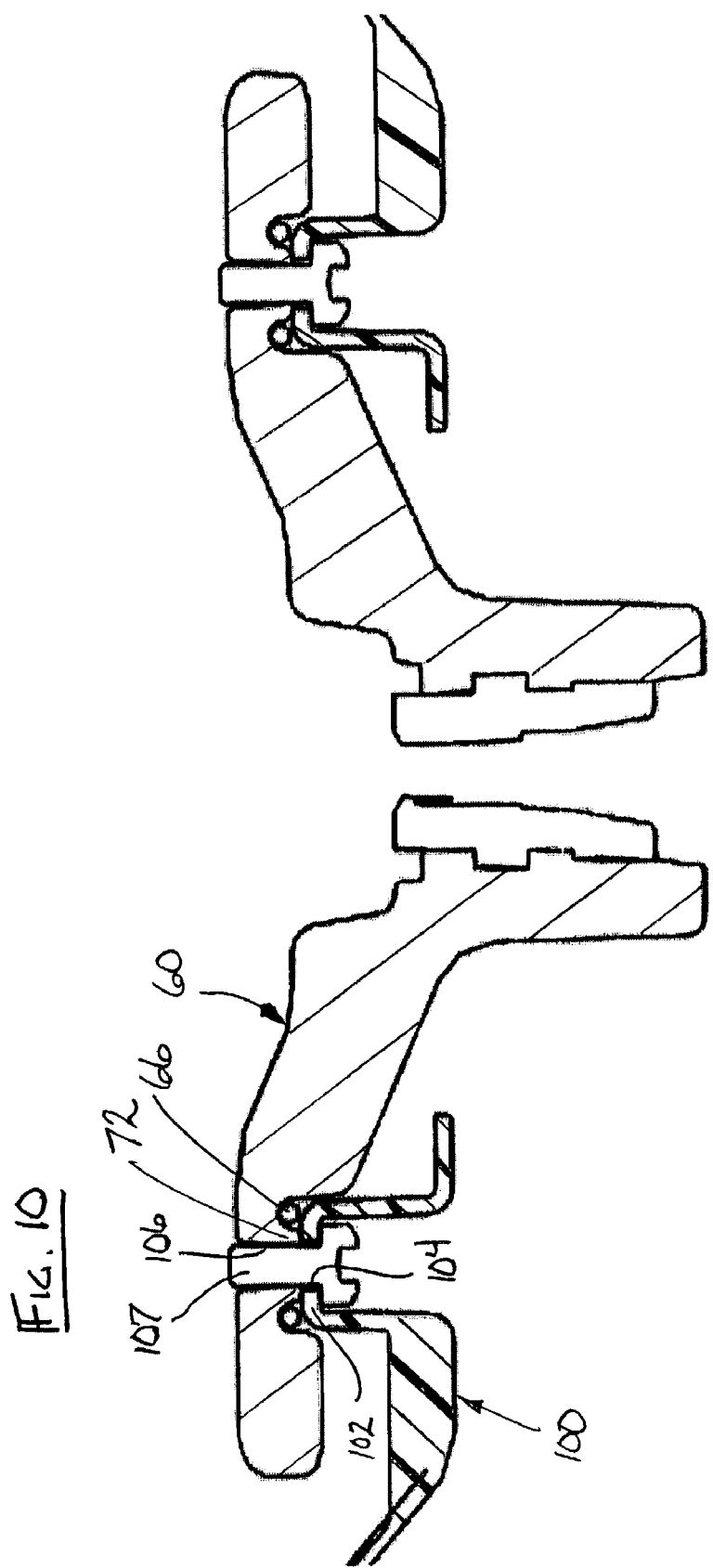
FIG. 10 is a cross-sectional view showing a boss on the back cover limiting displacement of the clips away from the recessed face of the armature cavity.

As is shown in FIGS. 9 and 10, the back cover 100 includes bosses 102 each having a hole 104 that is alignable with a passage 106 (FIG. 6) through the armature hubs 72 to receive a fastener 107 for coupling the back cover 100 to the armature 60 (FIG. 10). Each boss 102 is sized to extend laterally beyond its associated hub 72 so that the boss restricts movement of the clip away from the recessed face 71 of the armature, i.e., rotation or other movement opposite the assembly direction. Once the back cover 100 is coupled to the armature 60, each clip 66 is preferably captured at three points: (1) engagement of the second clip part 88 with the first armature engagement surface 90 proximate the first slot 74; (2) engagement of the second clip leg 84 with the second armature engagement surface 94 proximate the second slot 76; and (3) the boss 102 preventing displacement of the bend 82 away from the recessed face 71. The third capture point provided by the boss 102 limits movement of the clip bend 82 away from the recessed face when the pins 34 are being disposed into coupling engagement with the clips while not restricting the planar deflection of the second leg 84. While the first and second capture points are described herein as being provided by the preload engagement of the clip legs with the armature engagement surfaces, those skilled in the art will appreciate that alternative capture techniques may be used. However, the preload capturing is preferred in order to provide a more secure clip coupling to the armature both before and after connection of the back cover 100 to the armature 60.

The configuration of the illustrated armature 60 and clip 66 provide numerous advantages over conventional designs. For example, as is described above, the preload on the spring prior to connecting the back cover 100 to the armature 60 prevents inadvertent dislodgement of the clip 66 from the armature. Further, the three points of capture for the clip 66 once the back cover is connected further prevent undesired movement of the clip from the recessed face 71 when the pin 34 is inserted through the armature hole 64. Additionally, the design eliminates the need for additional retention components commonly used to retain the clip to the armature and simplifies the process for assembling or disassembling the clip to or from the armature.

During assembly, the airbag module 16 is connectable to the horn module 18 to form the airbag subassembly 14 and the clip 66 and back cover 100 are assembled with the steering wheel armature 60 in the manner described above. The airbag subassembly 14 is then secured to the steering wheel subassembly 12 via engagement of the locking pins 34 with the clips 66 (FIG. 2). During assembly, the airbag subassembly 14 is first positioned relative to the steering wheel subassembly 12 such that the locking pins 34 align with the respective holes 64 in the armature 60. The airbag subassembly 14 is then displaced toward the armature 60 whereupon the concentric contact surfaces 50 of the pins engage the clips 66. Further axial displacement of the subassembly 14 toward the armature displaces the clips away from the pin axis 52 (FIG. 6) and, once the clips 66 align with the circumferential grooves 54 in the pins, the clips snap back into the grooves to couple the airbag subassembly 14 to the armature 60.

Figure 11:
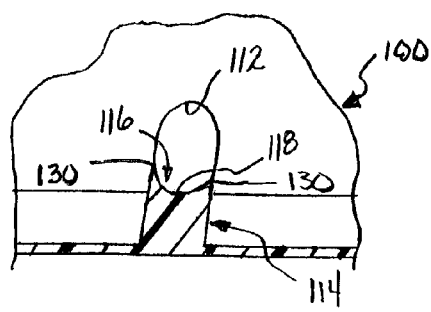
FIG. 11 is a cross-sectional view taken along the line 11—11 of FIG. 9.
Figure 12:
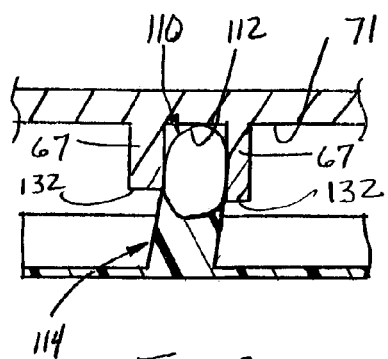
FIG. 12 is a cross-sectional view similar to that shown in FIG. 11 illustrating the mating of the back cover guide member with the armature.

In an alternate embodiment shown in FIGS. 9 and 11–15, the back cover 100 and armature 60 define a generally tubular access passage 110 (FIGS. 12 and 13) configured to receive a removal tool in order to displace the second clip leg 84 out of coupling engagement with the pin groove 54 and therefore facilitate removal of the airbag subassembly 14 from the steering wheel subassembly 12. In the illustrated embodiment, the back cover 100 includes a clearance hole 112 and a guide 114 having a semicircular recess 116 with an upper surface 118 (FIG. 11). The recess 116 is aligned with the clearance hole 112 and each are positioned on the back cover 100 to align with a gap 120 (FIG. 14) in the cavity sidewall 67 when the back cover 100 is attached to the armature 60. The guide 114 has a length 122 such that the guide overlaps the armature. An axis 124 of the passage 110 is oriented to intersect the second clip leg 84. The access passage 110 restrains the removal tool to axial displacement along the passage in order to guide the removal tool into engagement with the clip leg to permit displacement of the spring rod from its rest or coupled position (FIG. 3) to its disengaged position.

This feature of the invention provides an improved structure and method for removing the airbag subassembly 14 from the steering wheel subassembly 12. More particularly, in the illustrated embodiment, the removal tool 126 (FIGS. 14 and 15) is trapped in the access passage 110 between the armature 60 and the back cover 100. The pin/clip coupling may be disengaged by axially displacing the tool 126 in the passage and pressing the tool against the second clip leg 84 to move the clip toward its displaced position and out of coupling engagement with the pin 34. By limiting the tool to axial displacement in the passage 110, this structure facilitates alignment of the tool with the second clip leg 84 and blind uncoupling of the components.

Figure 13:
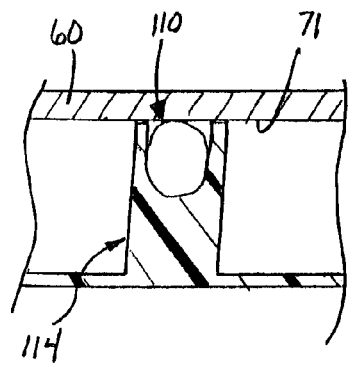
FIG. 13 is a cross-sectional view similar to that shown in FIG. 12 showing an alternative configuration of the guide member and armature.
Figure 14:
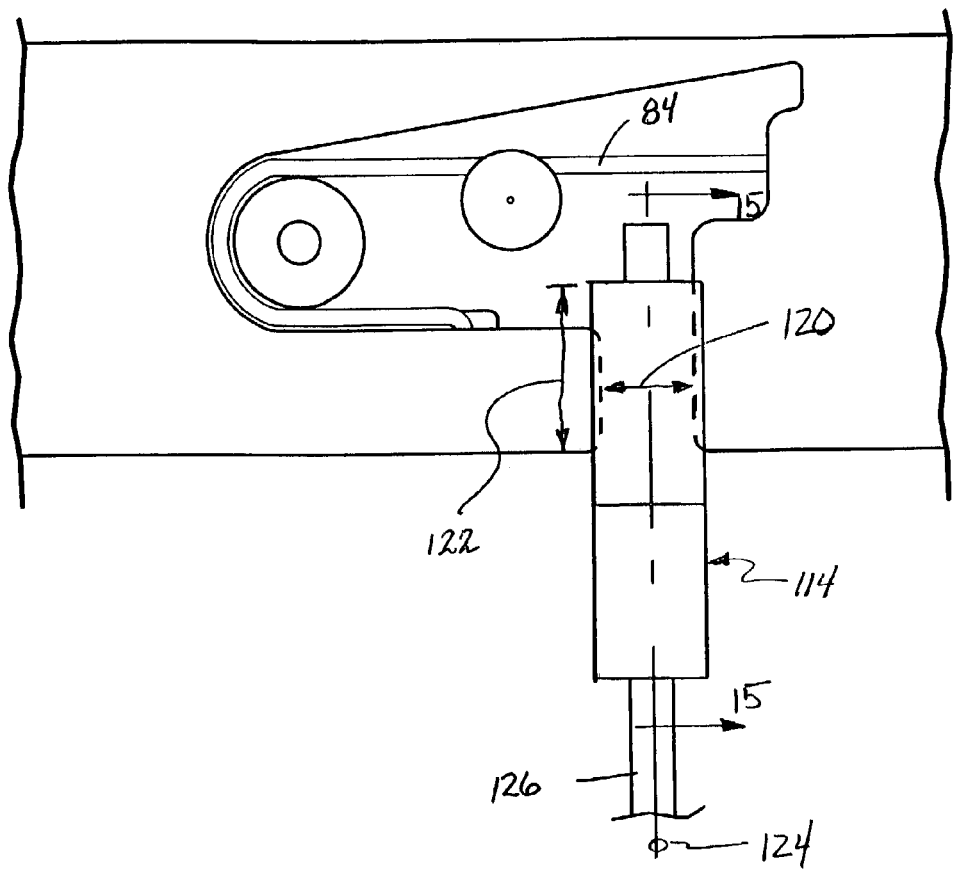
FIG. 14 is a plan view of a portion of the armature and the guide of the back cover.
Figure 15:
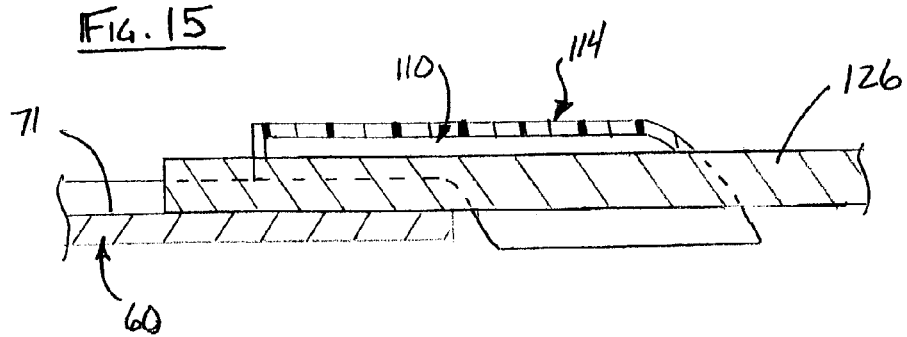
FIG. 15 is a sectional view taken along the line 15—15 of FIG. 14.

It should be appreciated that the access passage 110 may be formed by a variety of cooperative guide and armature configurations. For example, while the illustrated embodiment shows mating surfaces 130 (FIGS. 1 and 12) on the guide positioned above the upper recess surface 118 and mating surfaces 132 on the armature side walls 67 spaced from the recessed face 71 of the cavity, an alternative configuration is shown in FIG. 13 wherein the mating surfaces 130 on the guide are extended to mate with the recessed face 71 of the armature cavity. Further, while the removal tool 126 is shown to have a circular cross section, and the recess a cooperating arcuate configuration to receive the tool, other tool and recess configurations may be used with the present invention without departing from the scope of the invention defined by the appended claims.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims. By way of example rather than limitation, it is noted that while a specific configuration of the bracket 32, pins 34, clips 66, and back cover 100 are described with reference to the floating horn assembly shown in the drawings, the snap-in attachment features of the present invention may be equally suitable for use in other airbag module configurations. For example, many conventional systems use a non-floating horn arrangement with a pin or other coupler fixed to elements other than the described bracket 32. It should be appreciated that the claimed features of the present invention are suitable for these and other conventional arrangements.

What is claimed is:

1. A steering wheel assembly comprising:

a steering wheel subassembly including an armature to be supported by a steering shaft and a clip wherein
said armature has a body, said body including a recessed face to define a cavity, first and second slots communicating with said cavity, a first engagement surface proximate to said first slot, a second engagement surface proximate to said second slot, and a hole passing through said face;
said face, said first and second slots, said first and second engagement surfaces and said hole being formed directly on and integrally with said body, and
said clip has a first leg disposed in said first slot, a bend extending from said first leg, and a second leg extended from said bend, wherein said second leg is disposed in said second slot, wherein said clip is movable between a rest position and a deflected position and wherein, when said clip is in said rest position, said second leg partially obstructs said hole, said first leg exerts a preload on said first engagement surface, and a second leg exerts a preload on said second engagement surface; and an airbag subassembly including a mounting plate with a pin having an annular groove, said pin disposed in said hole and said clip disposed in said groove to couple said airbag subassembly to said steering wheel subassembly.

2. The steering wheel assembly of claim 1 wherein said airbag subassembly includes a horn module and an airbag module, and wherein said horn module includes a bracket defining said mounting plate and said airbag module has a housing coupled to said bracket.

3. The steering wheel assembly of claim 2 wherein said bracket includes a first connecting part support section, a second connecting part support section, and a connecting section intercoupling said first and second connecting part support sections.

4. The steering wheel assembly of claim 1 further including a cover coupled to said armature, said cover including an access opening and a guide having a recess aligned with said access opening, said access opening and recess cooperating with said armature to form an access passage aligned with said second leg to guide a removal tool into operative engagement with the second leg.

5. The steering wheel assembly of claim 4 wherein said access passage is configured to limit the removal tool to substantially axial movement within said access passage.

* * * * *